US008687534B2

(12) United States Patent
Hong et al.

(10) Patent No.: US 8,687,534 B2
(45) Date of Patent: Apr. 1, 2014

(54) METHOD AND SYSTEM FOR MANAGING AN INACTIVE INTERVAL OF A BASE STATION

(75) Inventors: Eun-Sil Hong, Suwon-si (KR); Hyeong-Jong Ju, Suwon-si (KR); Hyo-Jin Lee, Suwon-si (KR); Hoon Chang, Seoul (KR)

(73) Assignee: Samsung Electronics Co., Ltd (KR)

( * ) Notice: Subject to any disclaimer, the term of this patent is extended or adjusted under 35 U.S.C. 154(b) by 485 days.

(21) Appl. No.: 12/975,923

(22) Filed: Dec. 22, 2010

(65) Prior Publication Data

US 2011/0149821 A1    Jun. 23, 2011

(30) Foreign Application Priority Data

Dec. 22, 2009   (KR) .......................... 10-2009-0128744

(51) Int. Cl.
*G08C 17/00*    (2006.01)
*H04J 3/06*    (2006.01)

(52) U.S. Cl.
USPC .......................................... 370/311; 370/503

(58) Field of Classification Search
USPC .................. 370/311–338, 503–516
See application file for complete search history.

(56) References Cited

U.S. PATENT DOCUMENTS

2010/0309849 A1*  12/2010  Park et al. .................... 370/328
2011/0003591 A1*   1/2011  Venkatachalam et al. .... 455/434

OTHER PUBLICATIONS

"Proposed Text on the Femto Low-Duty Mode Operation (15.4.10)" by Hsu et al. Nov. 6, 2009, pp. 1-5, retreived from http://www.ieee802.org/16/tgm/contrib/C80216m-09_2302.doc.*
"Femtocell and MIMO Technologies in Advanced WiMAX Systems" by Industrial Technology Research Institute (ITRI), Oct. 15, 2010, pp. 1-24, retrieved from http://std-share.itri.org.tw/Content/Files/Event/Files%E9%83%AD%E7%A7%89%E8%A1%A1_Femtocell_and_MIMO.pdf.*

* cited by examiner

*Primary Examiner* — Xavier Wong
(74) *Attorney, Agent, or Firm* — The Farrell Law Firm, P.C.

(57) ABSTRACT

A method and system for managing an inactive interval of a Base Station (BS) are provided, in which the BS transmits a preferred Low-Duty Mode (LDM) pattern to a coordination server that manages LDM patterns of BSs, receives an LDM pattern from the coordination server, the LDM pattern being determined for the BS by the coordination server, taking into account the preferred LDM pattern and LDM patterns of neighbor BSs, and operates in an active interval and an inactive interval according to the received LDM pattern.

14 Claims, 7 Drawing Sheets

| field | Type | Descriptions |
|---|---|---|
| Inactive Interval | byte | frame number for Inactive interval |
| Active Interval | byte | frame number for active interval |
| start frame number | integer | start frame number for Low duty Mode |

FIG.7

METHOD AND SYSTEM FOR MANAGING AN INACTIVE INTERVAL OF A BASE STATION

PRIORITY

This application claims priority under 35 U.S.C. §119(a) to a Korean Patent Application filed in the Korean Intellectual Property Office on Dec. 22, 2009 and assigned Serial No. 10-2009-0128744, the content of which is incorporated herein by reference.

BACKGROUND OF THE INVENTION

1. Field of the Invention

The present invention relates generally to a mobile communication system, and more particularly, to a method and system for managing an inactive interval of a Base Station (BS) to minimize power consumption of the BS.

2. Description of the Related Art

Along with increased global attention on energy saving as a solution to environmental problems, the concept of green Information Technology (IT) has been introduced to the IT industry and many techniques for energy conservation have been developed. In this context, each mobile communication system has introduced the concept of a sleep mode to reduce power consumption of a pico/femto BS installed in a small space such as a building. For example, the Institute of Electrical and Electronics (IEEE) 802.16m standard defines a sleep mode called a "low-duty mode" for a BS.

Upon entering the low-duty mode, a BS activates an air interface and performs normal functions such as paging, broadcast message transmission, ranging, and traffic transmission during an available interval, whereas the BS inactivates the air interface during an unavailable interval. Therefore, the power consumption of the BS is reduced and interference with neighbor BSs is reduced during the unavailable interval.

To reduce power consumption and interference, an available interval and an unavailable interval are defined for a BS in each mobile communication system. Inactivation of a Radio Frequency (RF) interval during an unavailable interval is currently under consideration. For this purpose, a Low-Duty Mode (LDM) operation is performed, as will be described below, according to IEEE 802.16m.

A BS determines an LDM pattern for use during its available and unavailable intervals. The LDM pattern specifies an available interval, an available interval, and a start superframe number. An operation of the BS to be performed may be predicted from the LDM pattern. If all User Equipments (UEs) connected to a BS are in a sleep state or an idle state, the BS may enter the LDM. The BS transmits a message carrying an LDM pattern to the UEs. The UEs determine an operation pattern of the BS according to the LDM pattern and operate in accordance with the LDM operation of the BS.

When the BS autonomously determines its LDM pattern, its power conservation is optimized. However, if an available interval of the BS coincides with an available interval of a neighbor BS, mutual interference may occur between the BSs.

FIG. 1 illustrates a scenario in which two adjacent BSs enter their available intervals at the same time, creating interference at a cell edge.

Referring to FIG. 1, a first UE 130 (UE1) is connected to a first BS 110 (BS1), a second UE 140 (UE2) is connected to a second BS 120 (BS2), and the first UE 130 and the second UE 140 are located at a cell boundary between the first BS 110 and the second BS 120. As available intervals of the first BS 110 and the second BS 120 coincide, mutual interference occurs.

Accordingly, a need exists for a technique for preventing a BS using an LDM from interfering with a neighbor BS.

SUMMARY OF THE INVENTION

The present invention is designed to address at least the problems and/or disadvantages described above and to provide at least the advantages as will be described below.

Accordingly, an aspect of the present invention is to provide a method and system for reducing interference between adjacent neighbors by determining an LDM pattern for a BS, taking into account an LDM pattern of a neighbor BS.

In accordance with an aspect of the present invention, a method is provided for managing an inactive interval of a BS that operates in an LDM having an active interval and an inactive interval according to a predetermined pattern. In the method, the BS transmits a preferred LDM pattern to a coordination server that manages LDM patterns of BSs, receives an LDM pattern from the coordination server, the LDM pattern being determined for the BS, taking into account the preferred LDM pattern and LDM patterns of neighbor BSs by the coordination server, and operates in an active interval and an inactive interval according to the received LDM pattern.

In accordance with another aspect of the present invention, a method is provided for managing an inactive interval of a BS that operates in an LDM having an active interval and an inactive interval according to a predetermined pattern. In the method, the BS requests LDM patterns of neighbor BSs from a coordination server that manages LDM patterns of BSs, receives the LDM patterns of the neighbor BSs from the coordination server, determines an LDM pattern, taking into account the LDM patterns of the neighbor BSs, and transmitting the determined LDM pattern to the coordination server so that the coordination server updates an LDM pattern for the BS with the determined LDM pattern, and operates in an active interval and an inactive interval according to the determined LDM pattern.

In accordance with another aspect of the present invention, a method is provided for managing an inactive interval of a BS that operates in an LDM having an active interval and an inactive interval according to a predetermined pattern. In the method, the BS transmits an LDM pattern of the BS to neighbor BSs, when the BS determines or updates the LDM pattern, operates in an active interval and an inactive interval according to the determined LDM pattern, and receives LDM patterns of the neighbor BSs from the neighbor BSs.

In accordance with another aspect of the present invention, a system is provided for managing an inactive interval of a BS that operates in an LDM having an active interval and an inactive interval according to a predetermined pattern. The system includes a server that manages and determines LDM patterns of BSs, and a BS that transmits a preferred LDM pattern to the server, receives from the server an LDM pattern determined for the BS, taking into account the preferred LDM pattern and LDM patterns of neighbor BSs by the server, and operates in an active interval and an inactive interval according to the received LDM pattern.

In accordance with another aspect of the present invention, a system is provided for managing an inactive interval of a BS that operates in an LDM having an active interval and an inactive interval according to a predetermined pattern. The system includes a server that receives a request for LDM patterns of neighbor BSs from a BS, transmits current LDM patterns of the neighbor BSs to the BS, receives an LDM pattern from the BS, and updates an LDM pattern managed for the BS with the received LDM pattern, and the BS that determines the LDM pattern, taking into account the current LDM patterns of the neighbor BSs received from the server, transmits the determined LDM pattern to the server, and operates in an active interval and an inactive interval according to the determined LDM pattern.

In accordance with another aspect of the present invention, a system is provided for managing an inactive interval of a BS that operates in an LDM having an active interval and an inactive interval according to a predetermined pattern. In the system, each of a plurality of BSs receives LDM patterns of neighbor BSs from the neighbor BSs, transmits an LDM pattern of the BS to the neighbor BSs, when the BS determines or updates the LDM pattern, and operates in an active interval and an inactive interval according to the determined LDM pattern.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 7 illustrates a message carrying LDM information according to an embodiment of the present invention.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

While the embodiments of the present invention described below are described in the context of an IEEE 802.16m system extended from an IEEE 802.16e Worldwide interoperability for Microwave Access (WiMAX) system, the present invention is also applicable to any mobile communication system in which an inactive state is defined for a BS.

In accordance with an embodiment of the present invention, a method is provided for decreasing the probability of mutual interference between BSs by adjusting an LDM pattern of each BS.

Figure 1:
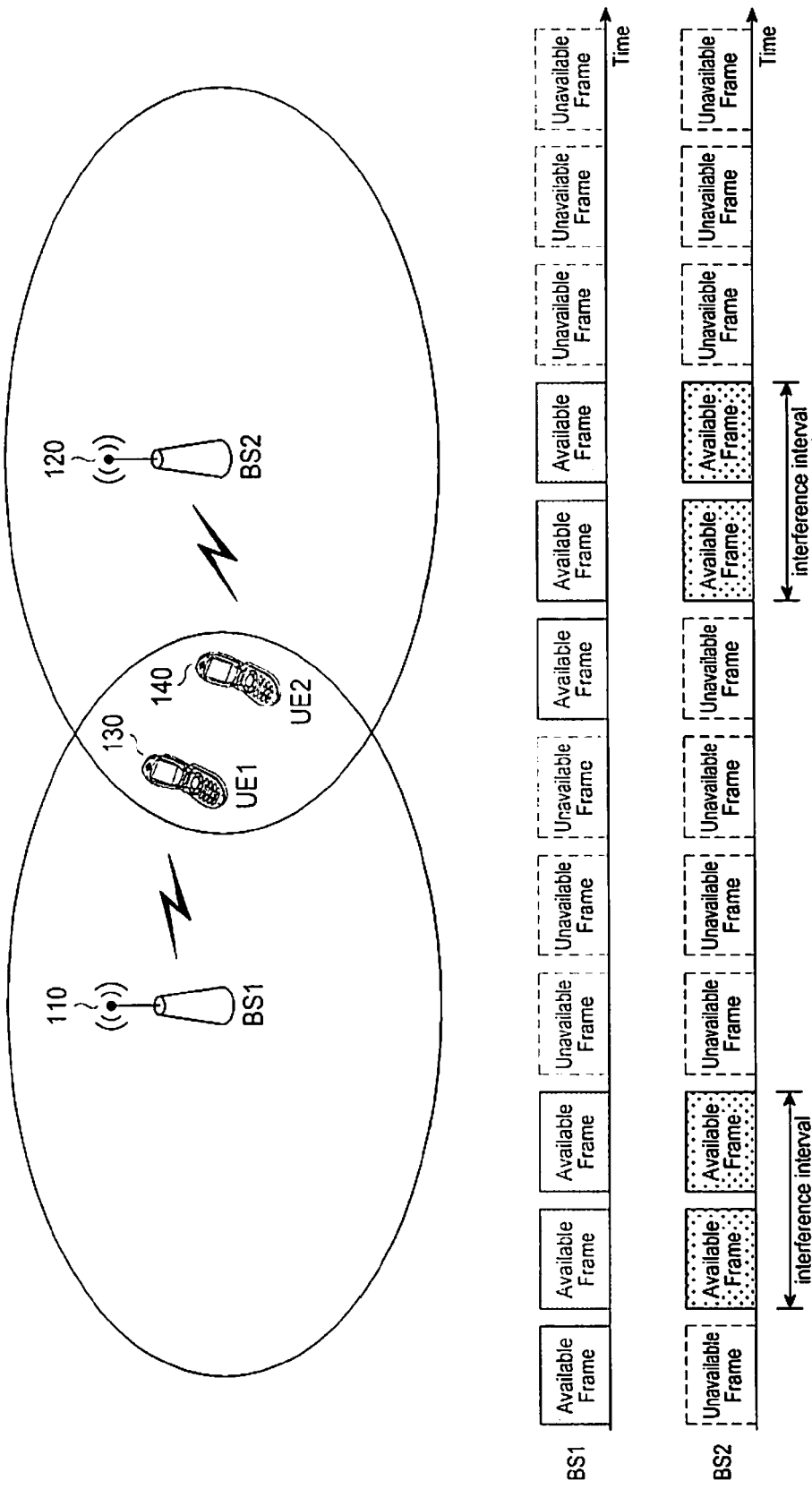
FIG. 1 illustrates interference between BSs according to conventional technology.
Figure 2:
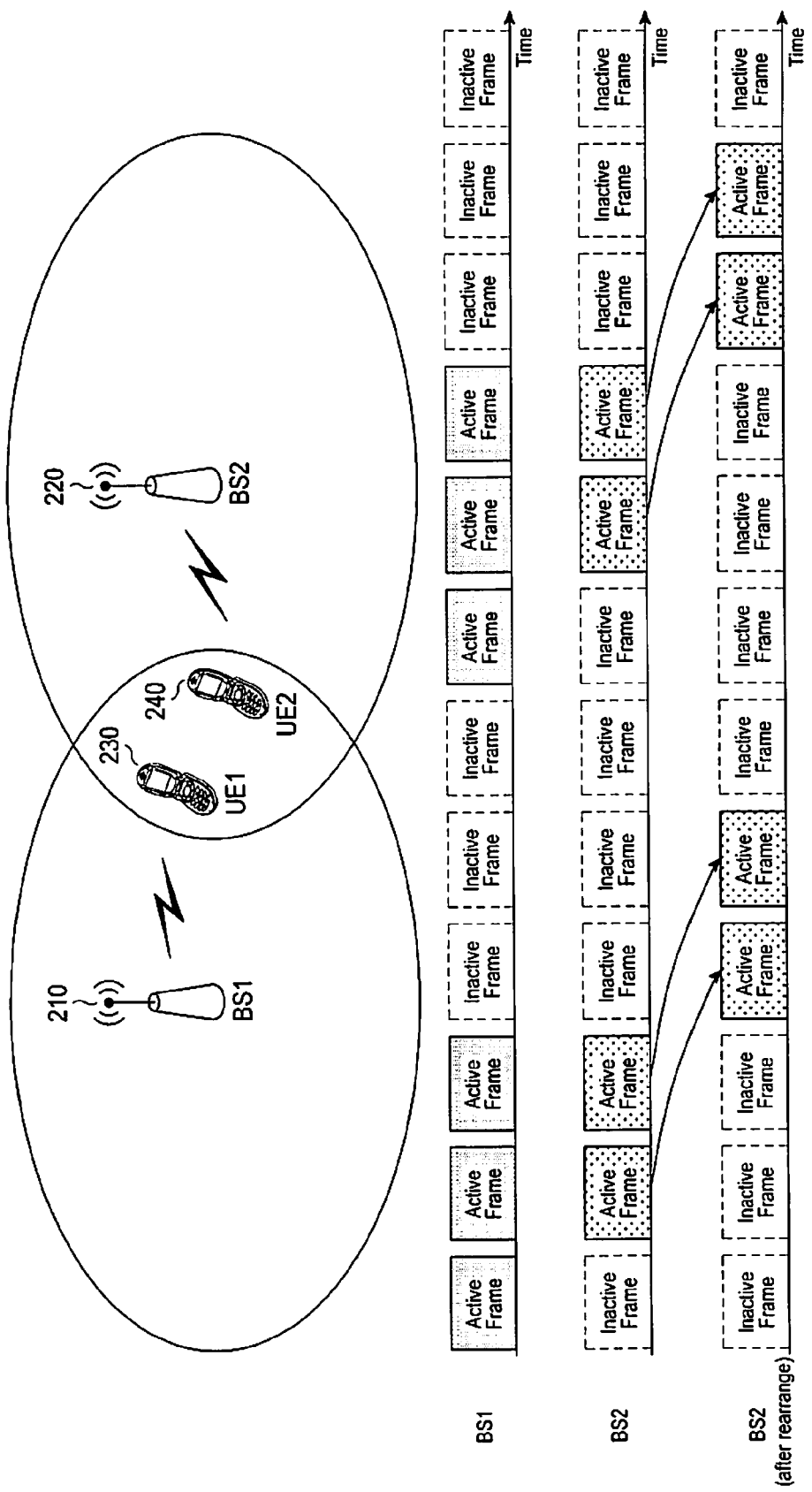
FIG. 2 illustrates interference cancellation between BSs according to an embodiment of the present invention.

FIG. 2 illustrates a method for adjusting an LDM pattern of a BS according to an embodiment of the present invention.

Referring to FIG. 2, a first UE 230 (UE1) is connected to a first BS 210 (BS1) and a second UE 240 (UE2) is connected to a second BS 220 (BS2). The first UE 230 and the second UE 240 are located at a cell boundary between the first BS 210 and the second BS 220. Therefore, when active intervals of the first BS 210 and the second BS 220 coincide with each other, mutual interference occurs. This interference may be prevented by rearranging the LDM pattern of the second BS 220 so that the active interval of the second BS 220 does not overlap with the active interval of the first BS 210.

In accordance with an embodiment of the present invention, each BS transmits its preferred LDM pattern to a coordination server. The coordination server determines an LDM pattern for each BS, such that active intervals of BSs do not overlap with one another and then notifies each BS of the determined LDM pattern (i.e., a centralized scheme).

Figure 3:
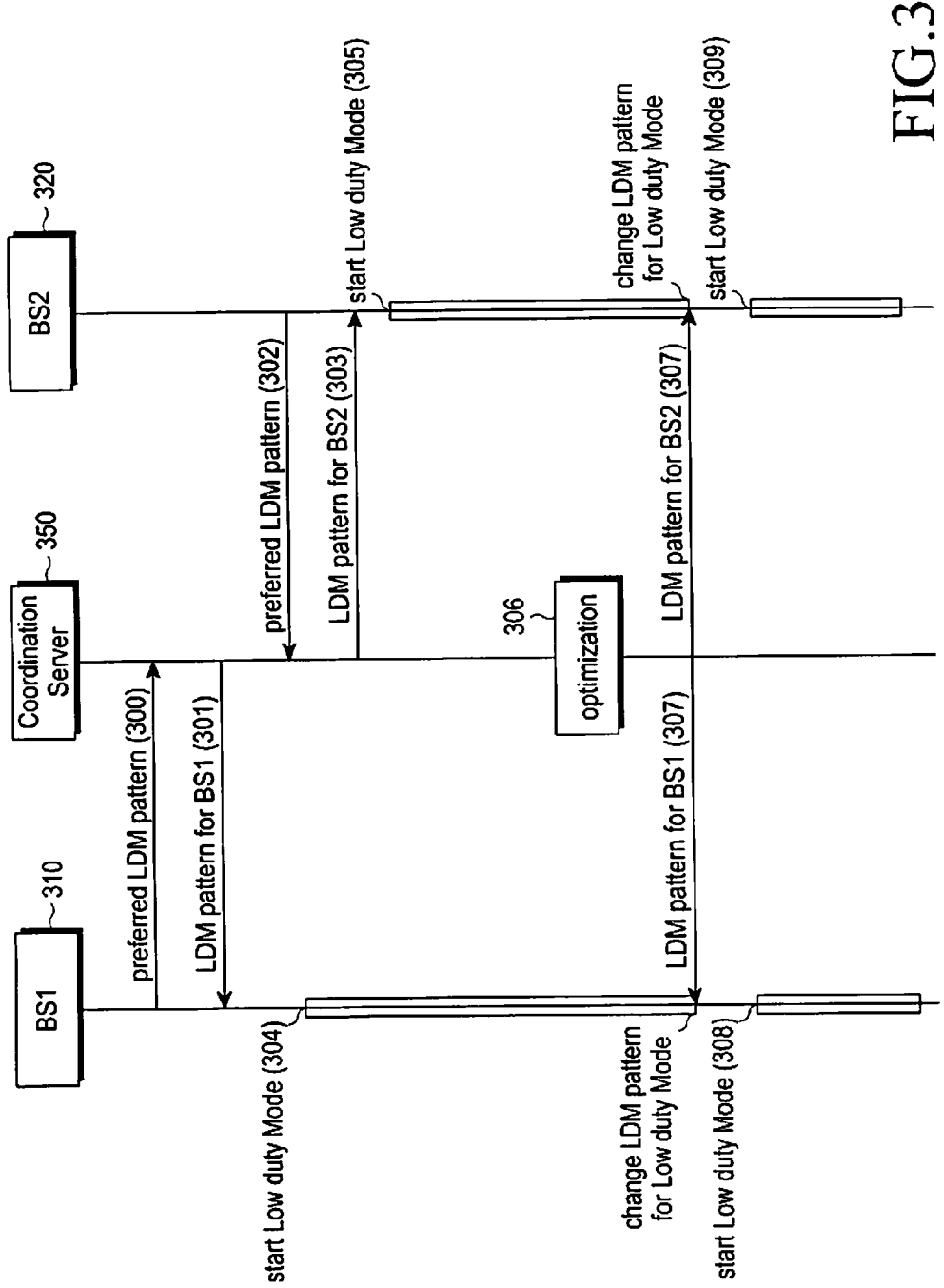
FIG. 3 is a signal flow illustrating a method for determining an LDM pattern for a BS according to an embodiment of the present invention.

FIG. 3 illustrates a method for determining an LDM pattern for a BS according to an embodiment of the present invention.

Referring to FIG. 3, BS1 310 transmits its preferred LDM pattern to a coordination server 350 in step 300. The coordination server 350 determines a final LDM pattern for BS1 310, taking into account LDM patterns of neighbour BSs that the coordination server 350 already knows, and notifies BS1 310 of the determined final LDM pattern in step 301. Similarly, BS2 320 transmits its preferred LDM pattern to the coordination server 350 in step 302. The coordination server 350 determines a final LDM pattern for BS2 320, taking into account LDM patterns of neighbour BSs that the coordination server 350 already knows, and notifies BS2 320 of the determined final LDM pattern in step 303. BS1 and BS2 start an LDM at predetermined time points according to their LDM patterns in step 305. Thereafter, BS1 310 and BS2 320 operate in repeated active/inactive intervals according to their LDM patterns.

If it is necessary to rearrange the LDM patterns of BS1 310 and BS2 320 for another BS, the coordination server 350 optimizes the LDM patterns of the BSs in step 306 and notifies each BS of a determined LDM pattern for the BS in step 307. Thereafter, BS1 310 and BS2 320 start the LDM at time points specified by the notified LDM patterns in steps 308 and 309, and operate in repeated active/inactive intervals according to their LDM patterns.

In accordance with another embodiment of the present invention, after acquiring information about LDM patterns of neighbour BSs from a coordination server, a BS may autonomously determine its own LDM pattern (i.e., a hybrid scheme).

Figure 4:
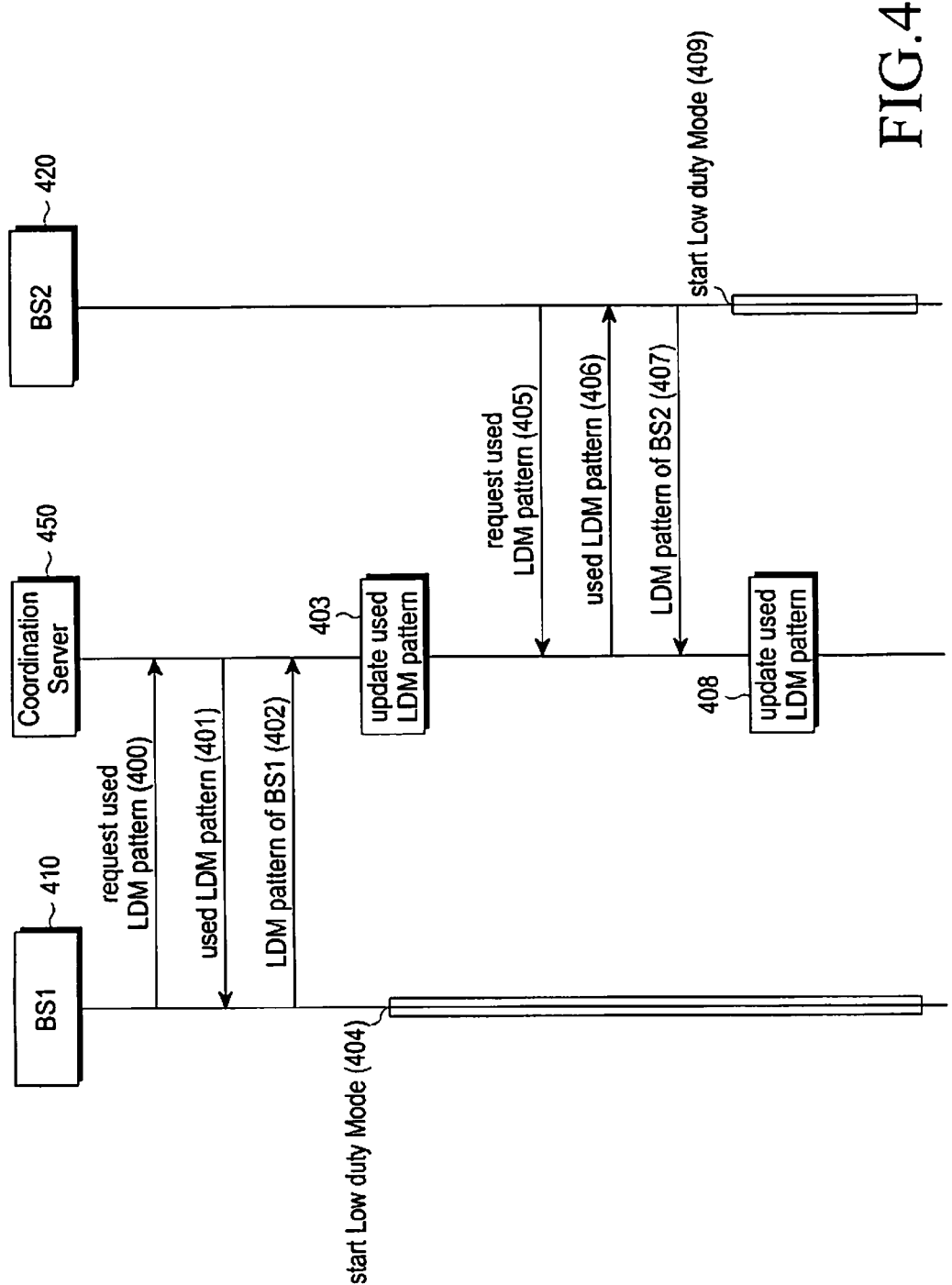
FIG. 4 is a signal flow illustrating a method for determining an LDM pattern for a BS according to an embodiment of the present invention.

FIG. 4 is a signal flow illustrating a method for determining an LDM pattern for a BS according to an embodiment of the present invention.

Referring to FIG. 4, when BS1 410 requests information about LDM patterns of neighbor BSs from a coordination server 450 in step 400, the coordination server 450 transmits the information about the current LDM patterns of the neighbor BSs to BS1 410 in step 401. Thereafter, BS1 410 determines its own LDM pattern based on the LDM patterns of the neighbor BSs notified by the coordination server 450 and then notifies the coordination server 450 of the determined LDM pattern in step 402. The coordination server 450 updates its managed LDM pattern for BS1 410 with the received LDM pattern in step 403. In step 404, BS1 410 starts the LDM and operates in repeated active/inactive intervals according to its determined LDM pattern.

Similarly, when BS2 420 requests information about LDM patterns of neighbor BSs from the coordination server 450 in step 405, the coordination server 450 transmits the information about the current LDM patterns of the neighbor BSs to BS2 420 in step 406. Thereafter, BS2 420 determines its own LDM pattern based on the LDM patterns of the neighbor BSs notified by the coordination server 450 and then notifies the coordination server 450 of the determined LDM pattern in step 407. The coordination server 450 updates its managed LDM pattern for BS2 with the received LDM pattern in step 408. In step 409, BS2 420 starts the LDM and operates in repeated active/inactive intervals according to its determined LDM pattern.

In accordance with another embodiment of the present invention, adjacent BSs may directly exchange their LDM patterns without the aid of a coordination server, and thus, each BS may determine its own LDM pattern based on the LDM patterns of its neighbor BSs (i.e., a distributed scheme). That is, when a BS initially determines its own LDM pattern or updates it, the BS transmits information about its LDM pattern to neighbor BSs listed in a neighbor list. Each BS then determines its own LDM pattern based on information about the LDM patterns of neighbor BSs.

Figure 5:
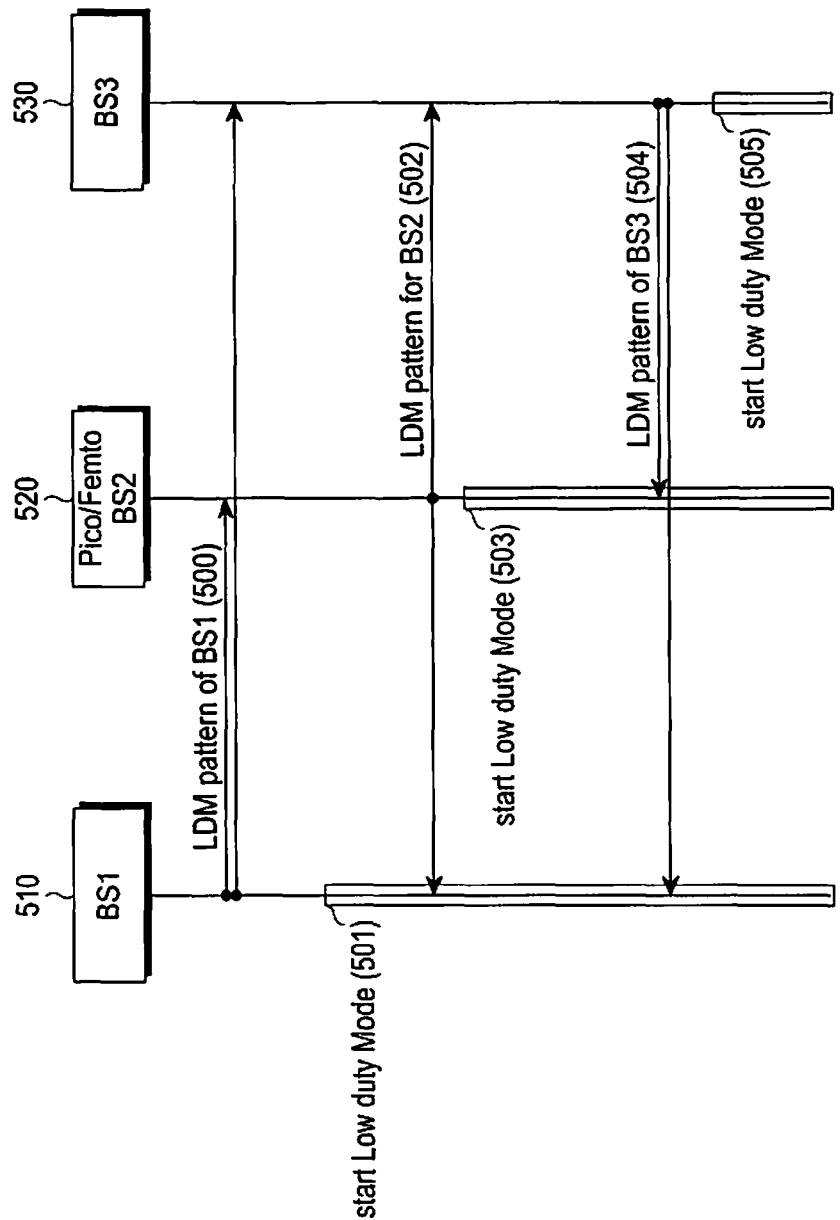
FIG. 5 is a signal flow illustrating a method for determining an LDM pattern for a BS according to an embodiment of the present invention.

FIG. 5 is a signal flow illustrating a method for determining an LDM pattern for a BS according to an embodiment of the present invention.

Referring to FIG. 5, when BS1 510 initially determines or updates its LDM pattern, BS1 510 transmits its determined or updated LDM pattern to BS2 520 and BS3 530 in step 500. In step 501, BS1 510 starts the LDM and operates in repeated active/inactive intervals according to its determined or updated LDM pattern.

When BS2 520 initially determines or updates its LDM pattern, BS2 520 transmits its determined or updated LDM pattern to BS1 510 and BS3 530 in step 502. In step 503, BS2 520 starts the LDM and operates in repeated active/inactive intervals according to its determined or updated LDM pattern.

Similarly, when BS3 530 initially determines or updates its LDM pattern, BS3 530 transmits its determined or updated LDM pattern to BS1 510 and BS2 520 in step 504. In step 505, BS3 530 starts the LDM and operates in repeated active/inactive intervals according to its determined or updated LDM pattern.

Figure 6:
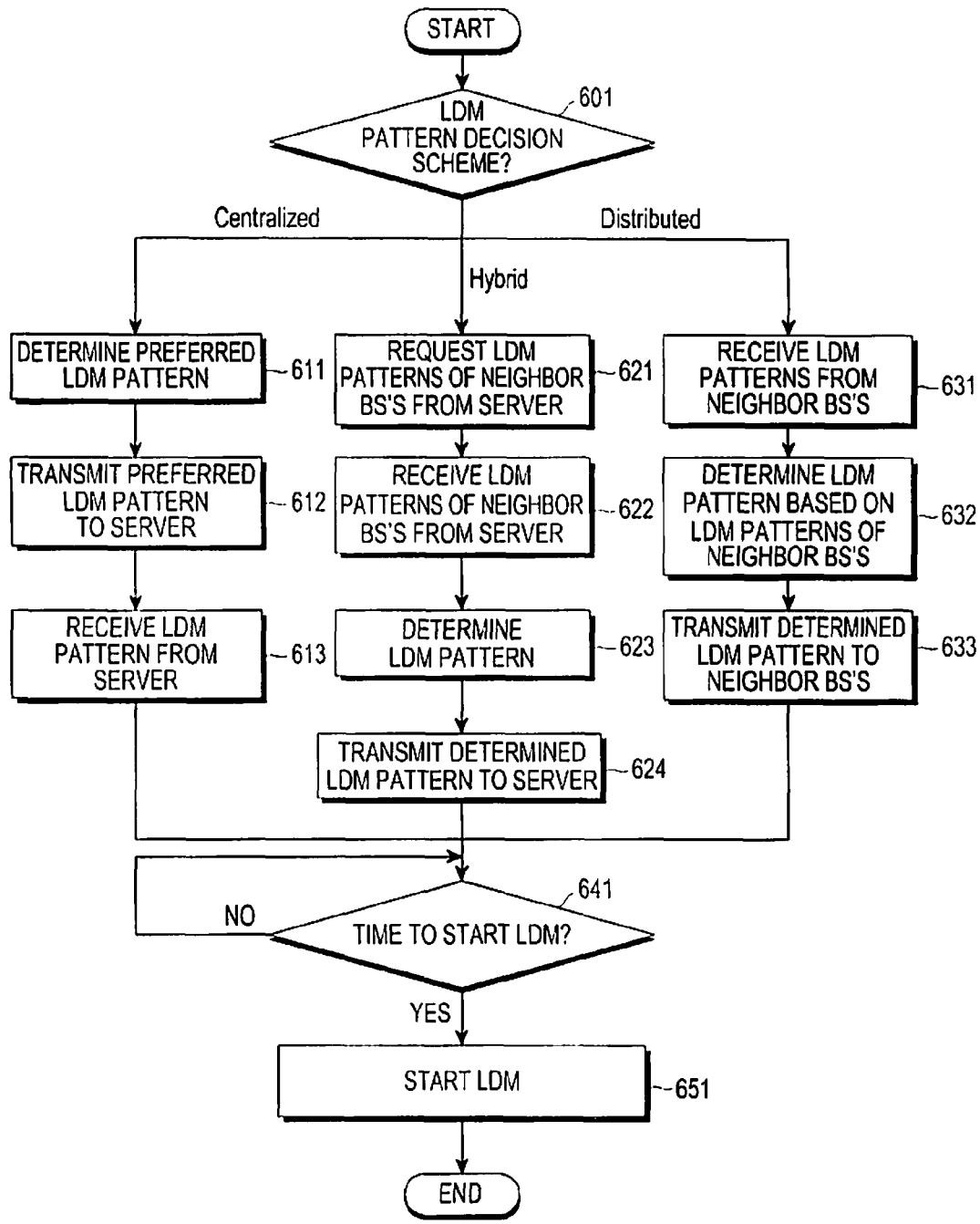
FIG. 6 is a flowchart illustrating an operation for determining an LDM pattern for a BS according to an embodiment of the present invention.

FIG. 6 is a flowchart illustrating an operation for determining an LDM pattern for a BS according to an embodiment of the present invention.

Referring to FIG. 6, when a BS determines to start an LDM, the BS selects an LDM pattern decision scheme in step 601.

If the centralized scheme has been selected, the BS determines its preferred LDM pattern in step 611, transmits the preferred LDM pattern to a coordination server in step 612, and receives a final LDM pattern from the coordination server in step 613.

If the hybrid scheme has been selected, the BS requests LDM patterns of neighbor BSs from the coordination server in step 621, receives the LDM patterns of the neighbor BSs from the coordination server in step 622, and determines its own LDM pattern based on the LDM patterns of the neighbor BSs in step 623. In step 624, the BS transmits the determined LDM pattern to the coordination server.

If the distributed scheme has been selected, the BS receives LDM patterns of neighbor BSs from the neighbor BSs in step 631, determines its LDM pattern based on the LDM patterns of the neighbor BSs in step 632, and transmits its LDM pattern to the neighbor BSs in step 633.

In step 641, the BS determines whether it is time to start the LDM. If it is time to start the LDM, the BS operates in the LDM according to the LDM pattern in step 651.

FIG. 7 illustrates a message carrying LDM information according to an embodiment of the present invention.

Referring to FIG. 7, when a BS operates in the LDM, a message carrying information about a determined LDM pattern according to the above-described embodiments of the present invention may include the number of frames for an active interval, the number of frames for an inactive interval, and a start frame number of the LDM. Alternatively, the active and inactive intervals may be indicated by a bitmap.

As is apparent from the above description, the above-described embodiments of the present invention can reduce mutual interference between BSs by adjusting the LDM pattern of each BS according to the LDM patterns of its neighbor BSs.

The above-described embodiments of the present invention may also be implemented as code that can be written to a non-transitory computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been shown and described with reference to certain embodiments thereof, it will be understood by those skilled in the art that various changes in form and details may be made therein. Therefore, the scope of the present invention should be determined by the appended claims and their legal equivalents, not by the above description, and all changes coming within the meaning and equivalency range of the appended claims are intended to be embraced therein.

What is claimed is:

1. A method for managing an inactive interval of a Base Station (BS) that operates in a Low Duty Mode (LDM) having an active interval and the inactive interval according to a predetermined pattern, the method comprising:

transmitting, by the BS, a preferred LDM pattern to a coordination server that manages LDM patterns of BSs;

receiving, by the BS, an LDM pattern from the coordination server, the LDM pattern being determined for the BS by the coordination server, taking into account the preferred LDM pattern and LDM patterns of neighbor BSs; and operating, by the BS, in the active interval and the inactive interval according to the received LDM pattern.

2. The method of claim 1, further comprising:

receiving, by the BS, a new LDM pattern from the coordination server, when an LDM pattern of a neighbor BS changes while the BS is operating in the active interval and the inactive interval according to the received LDM pattern; and operating, by the BS, in the active interval and the inactive interval according to the new LDM pattern.

3. The method of claim 1, wherein the LDM patterns are determined so that the active interval of the BS does not overlap with active intervals of the neighbor BSs.

4. A method for managing an inactive interval of a Base Station (BS) that operates in a Low Duty Mode (LDM) having an active interval and the inactive interval according to a predetermined pattern, the method comprising:
- requesting, by the BS, LDM patterns of neighbor BSs from a coordination server that manages LDM patterns of BSs;
- receiving, by the BS, the LDM patterns of the neighbor BSs from the coordination server;
- determining, by the BS, an LDM pattern, taking into account the LDM patterns of the neighbor BSs;
- transmitting the determined LDM pattern to the coordination server so that the coordination server updates the LDM patterns with the determined LDM pattern; and
- operating, by the BS, in the active interval and the inactive interval according to the determined LDM pattern.

5. A method for managing an inactive interval of a Base Station (BS) that operates in a Low Duty Mode (LDM) having an active interval and the inactive interval according to a predetermined pattern, the method comprising:
- receiving, by the BS, LDM patterns of neighbor BSs from the neighbor BSs
- determining or updating, by the BS, an LDM pattern of the BS;
- transmitting, by the BS, the determined or updated LDM pattern to the neighbor BSs; and
- operating, by the BS, in the active interval and the inactive interval according to the determined or updated LDM pattern.

6. The method of claim 5, wherein when the BS determines or updates the LDM pattern, taking into account the LDM patterns of the neighbor BSs.

7. The method of claims 4, wherein the BS determines or updates the LDM pattern such that the active interval of the BS does not overlap with active intervals of the neighbor BSs.

8. A system for managing an inactive interval of a Base Station (BS) that operates in a Low Duty Mode (LDM) having an active interval and the inactive interval according to a predetermined pattern, the system comprising:
- a server for managing and determining LDM patterns of BSs; and
- a BS for transmitting a preferred LDM pattern to the server, receiving, from the server, an LDM pattern determined for the BS by the server, taking into account the preferred LDM pattern and LDM patterns of neighbor BSs, and operating in the active interval and the inactive interval according to the received LDM pattern.

9. The system of claim 8, wherein the BS receives a new LDM pattern from the server, when an LDM pattern of a neighbor BS changes while the BS is operating in the active interval and the inactive interval according to the received LDM pattern, and operates in the active interval and the inactive interval according to the new LDM pattern.

10. The system of claim 8, wherein the server determines the LDM patterns for the BS such that the active interval of the BS does not overlap with active intervals of the neighbor BSs.

11. A system for managing an inactive interval of a Base Station (BS) that operates in a Low Duty Mode (LDM) having an active interval and the inactive interval according to a predetermined pattern, the system comprising:
- a server for receiving a request for LDM patterns of neighbor BSs from a BS, transmitting current LDM patterns of the neighbor BSs to the BS, receiving an LDM pattern from the BS, and updating an LDM pattern managed for the BS with the received LDM pattern; and
- the BS for determining the LDM pattern, taking into account the current LDM patterns of the neighbor BSs received from the server, transmitting the determined LDM pattern to the server, and operating in the active interval and the inactive interval according to the determined LDM pattern.

12. A system for managing an inactive interval of a Base Station (BS) that operates in a Low Duty Mode (LDM) having an active interval and the inactive interval according to a predetermined pattern, the system comprising:
- a plurality of BSs, each of which, receives LDM patterns of neighbor BSs from the neighbor BSs, transmits its own LDM pattern to the neighbor BSs, when the BS determines or updates its own LDM pattern, and operates in the active interval and the inactive interval according to its own LDM pattern.

13. The system of claim 12, wherein when the BS determines or updates its own LDM pattern, taking into account the LDM patterns of the neighbor BSs.

14. The system of claim 11, wherein the BS determines its own LDM pattern such that the active interval of the BS does not overlap with active intervals of the neighbor BSs.

* * * * *